Figure 1:
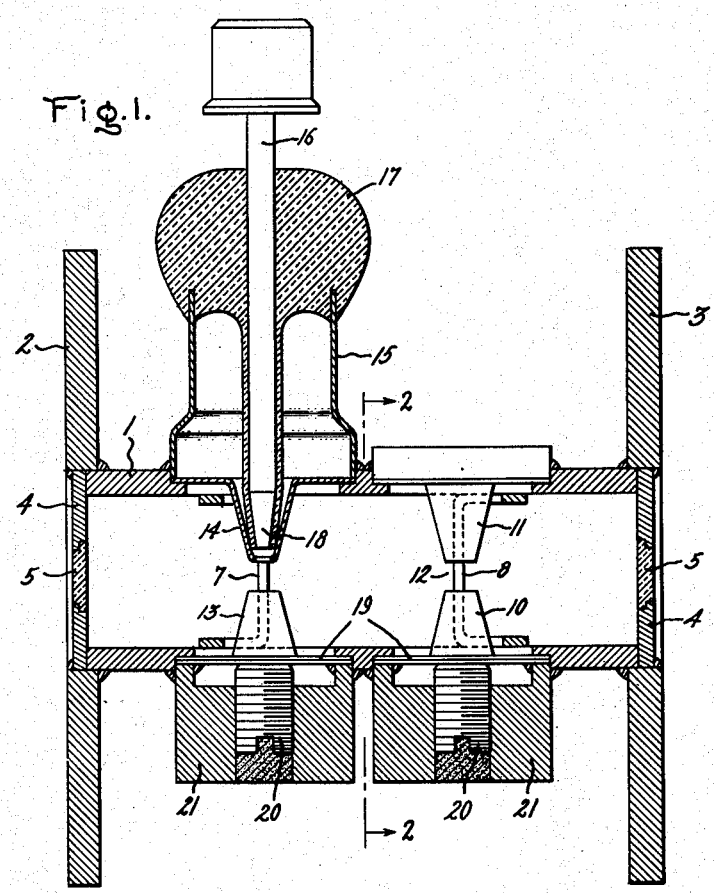

Nov. 11, 1952     W. J. SCOTT     2,617,957
GASEOUS ELECTRIC DISCHARGE DEVICE
Filed June 30, 1950

Inventor:
William J. Scott,
by Merton D Morse
His Attorney.

Patented Nov. 11, 1952

2,617,957

UNITED STATES PATENT OFFICE 2,617,957

GASEOUS ELECTRIC DISCHARGE DEVICE

William J. Scott, Rugby, England, assignor to General Electric Company, a corporation of New York Application June 30, 1950, Serial No. 171,339
In Great Britain July 22, 1949

6 Claims. (Cl. 313—174)

1

The present invention relates to improvements in gaseous electric discharge devices and more particularly to prolonging the useful life and preserving the de-ionization characteristics of discharge devices having a gaseous filling including water vapor for decreasing the time required for de-ionization.

In certain uses of gaseous discharge devices, it is important that at the cessation of a discharge the discharge path should be de-ionized as rapidly as possible, and it is well known in the art that the introduction of water-vapor into a device causes the de-ionization time to be reduced.

It has been found, however, that the life of such gaseous discharge devices is limited by dissociation of the water-vapor in the electric discharge, hydrogen and oxygen being formed and the water-vapor density decreasing. The oxygen may oxidize the material of the container and so be "cleaned up" leaving the hydrogen as a gas.

The decrease in water-vapor density causes an increase in the de-ionization time and the increasing surplus of hydrogen increases the power loss so much that ultimately the device is rendered useless.

It has previously been proposed to maintain the necessary water-vapor density by plating the inside of the device with gold, which does not readily react with oxygen. It was hoped that the dissociated oxygen would not be "cleaned up" and would recombine with the hydrogen to form water-vapor to replace that which was dissociated but devices so treated have also had unduly limited lives.

Water-vapor reservoirs have been used with partial success, but the devices fail ultimately because of the accumulation of hydrogen in the device as the water is dissociated.

According to the present invention a gaseous discharge device containing water-vapor includes a catalyst, from the group comprising iridium, osmium, palladium and platinum, which is active in the presence of the water-vapor to catalyze hydrogen and oxygen into water.

The inclusion of the catalyst maintains the required water-vapor density to promote rapid de-ionization and uses up the surplus hydrogen in so doing.

One example of a use for such a device is in a system for transmitting high frequency signals and receiving echoes of them through a single antenna. A system and devices of this type are described and claimed in Fiske Patent 2,422,190, dated June 17, 1947 and assigned to the assignee of this application.

The receiver, being designed for low intensity reflections, would be damaged by high intensity signals, and hence must be disconnected from the system during transmission periods. On the other hand, the reflected signals may be so weak

2 that any avoidable loss in the transmitter equipment might render them too weak for reception. The transmitter must therefore be disconnected during reception periods. A gaseous discharge device may be used and be adapted to break down in the presence of the transmitted signals to effectively short out the receiver. The reflected signals are, however, insufficient to break down the device and the receiver is therefore effectively coupled to the antenna for the received signals provided the device is sufficiently de-ionized. It is desirable that when once a transmitted signal has passed to the antenna, that the discharge should cease and the path be de-ionized rapidly to prepare for the reception of the echo. A suitable filling for a device of this type may include a rare gas such as argon at a pressure of 8 to 12 millimeters of mercury at room temperature, together with water-vapor at pressure up to 4½ millimeters of mercury. As the water-vapor pressure is increased, the de-ionization time decreases, but the losses in the device increase with increases in water-vapor pressure so that the water-vapor pressure to be used involves a balance between these two factors.

The life of devices of the above type is limited by the dissociation of the water vapor and the accumulation of hydrogen and in accordance with the present invention an appreciable increase in this life is achieved by including a catalyst in the device which will effect the recombination of the hydrogen and oxygen to replenish the supply of water-vapor.

Figure 2:
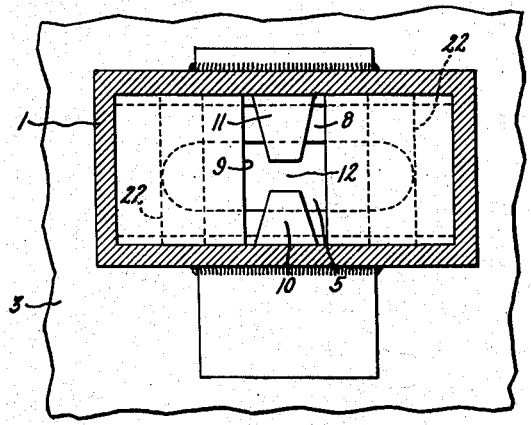
Figure 3:
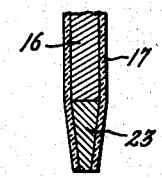

My invention will be better understood from a detailed description of a specific embodiment thereof illustrated in the drawing in which Fig. 1 is an elevational view in section of a discharge device suitable for disconnecting the receiver from a high frequency system in which a single antenna is employed for both transmission and reception of the high frequency waves; Fig. 2 is a sectional view along the line 2—2 of Fig. 1; and Fig. 3 is an elevational view in section of a starting electrode for the device of Fig. 1 in accordance with a modification of my invention.

Referring now to the drawing, I have shown my invention embodied in a discharge device including a short section of rectangular wave guide defined by a metallic wall 1 having at each end thereof coupling flanges 2 and 3 for coupling at one end with a wave guide extending between the transmitter and the antenna and at the other end with a receiver. The wave guide section is closed at the ends by window assemblies including a metal frame 4 and a dielectric window 5. The windows may to advantage be formed of glass and are suitably dimensioned with respect to the frequency of operation of the system in which the device is to be used.

Extending across the wave guide section 1 intermediate the ends thereof are transverse metal partitions 7 and 8 which are spaced apart and from the ends of the device in the direction of propagation of waves through the device a distance corresponding to one quarter wave length at the operating frequency. The partitions, as shown in Fig. 2, are each provided with a rectangular opening 9 which is centrally located with respect to the cross section of the device. A pair of conical members 10 and 11 are supported from the opposite side walls of the wave guide in line with the partition 8. These conical members provide a narrow gap 12 at the plane of the partition. A similar conical member 13 extends upward from the lower wall of the guide at the plane of partition 7 and a corresponding conical tip 14 extends from the upper wall. This tip forms the lower part of an eyelet 15 which supports in insulated relation an ignition electrode and lead-in conductor 16. The conductor is supported in insulated relation with respect to the eyelet 14 by means of a glass bead 17 sealed to the upper edge of the eyelet and extending down to the end of the ignition electrode, but leaving the end of the electrode exposed at 18.

The conical members 10 and 13 are supported from the lower wall by resilient disks 19 so they may be adjusted to control the gaps between the cooperating conical members. The adjustment is accomplished by suitable adjusting screws 20 threaded into supporting blocks 21.

As mentioned earlier in the specification, the device may be filled with a rare gas, such as argon, and a water-vapor at a pressure up to 4½ millimeters of mercury for the purpose of decreasing the de-ionization time after the space within the device has been ionized as a result of a high intensity wave being impressed on the window 5 of the flange 3. In order to prevent the cumulative dissociation of the water-vapor into hydrogen and oxygen, the latter of which tends to be absorbed by the metal parts of the device, I provide a catalyst within the device which tends to effect the recombination of the hydrogen and oxygen to maintain the supply of water-vapor. To this end a substantial area of a catalyst from the group above-mentioned, and preferably palladium, on the interior of the finished device is provided. The palladium may be applied in different ways and in the modification shown in Fig. 1 a substantial area of the metal partition members 7 and 8 on the sides facing the windows 5 is provided with a palladium coating 22 which may be the reduction product of a coating of palladium chloride applied to the surface. The palladium chloride may be reduced by subjecting the interior of the device to a hydrogen atmosphere at an elevated temperature during manufacture of the device.

It is highly desirable in connection with the present invention that the metal surfaces not coated with palladium be plated with a noble metal of high conductivity such as gold or silver, and particularly silver. These materials not only reduce the resistance losses within the device but also minimize the "clean up" of the oxygen that results from dissociation of the water vapor.

Instead of coating the interior wall of the metal parts with palladium, the end of the ignition electrode may be provided with a palladium tip as illustrated at 23 in Fig. 3. In the operation of the device, considerable sputtering of the electrode material takes place so that a substantial area of palladium coating around the electrode results. In this manner a substantial area of palladium is available for catalyzing the hydrogen and oxygen resulting from dissociation of the water vapor with a result that the water supply is replenished. As a result of my invention, the useful life of devices of the above character has been greatly increased.

What I claim as new and desire to secure by Letters Patent of the United States is:

1. An electric discharge device including a vacuum-tight enclosure having a filling including a rare gas and water-vapor, means for maintaining the water-vapor pressure during operation of the device including a surface of palladium exposed to the interior of the device.

2. A high frequency electric discharge device including a vacuum-tight enclosure having a filling including a rare gas and water-vapor for increasing the rate of deionization of the gas and means for maintaining the water-vapor pressure during operation of the device including a surface of palladium exposed to the interior of the device, the remainder of the metal surfaces of the interior having a silver coating.

3. An electric discharge device including a vacuum-tight enclosure having a filling including a rare gas and water-vapor, means within the device for maintaining the water-vapor pressure including a palladium surface and a surface which does not readily absorb oxygen.

4. An electric discharge device including a vacuum-tight enclosure having a filling of a rare gas and water-vapor and means for minimizing the reduction of water-vapor pressure during operation of the device including a surface of palladium formed by reducing palladium chloride on an interior surface of the device.

5. An electric discharge device including a vacuum-tight enclosure and an ignition initiating electrode extending into the envelope, said envelope having a filling of a rare gas and water-vapor and means for minimizing the reduction of water-vapor pressure during operation of the device including a body of palladium forming a part of said ignition initiating electrode.

6. An electric discharge device including a vacuum tight enclosure having a filling of rare gas and water-vapor, and means for minimizing the reduction of water-vapor pressure during operation of the device including a surface consisting of a metal of the group consisting of iridium, osmium, palladium and platinum exposed to the interior of the device.

WILLIAM J. SCOTT.

REFERENCES CITED

The following references are of record in the file of this patent:

UNITED STATES PATENTS

| Number | Name | Date |
|---|---|---|
| 1,720,172 | Dessauer | July 9, 1929 |
| 2,438,873 | McCarthy | Mar. 30, 1948 |
| 2,526,038 | Nelson | Oct. 17, 1950 |

OTHER REFERENCES

Comprehensive Treatise on Inorganic & Theoretical Chemistry, by Mellor, publ. 1936, vol. 15, pg. 626.